June 1, 1937.  A. W. DUNN  2,082,384
DUAL WHEEL
Filed June 10, 1935   3 Sheets-Sheet 1
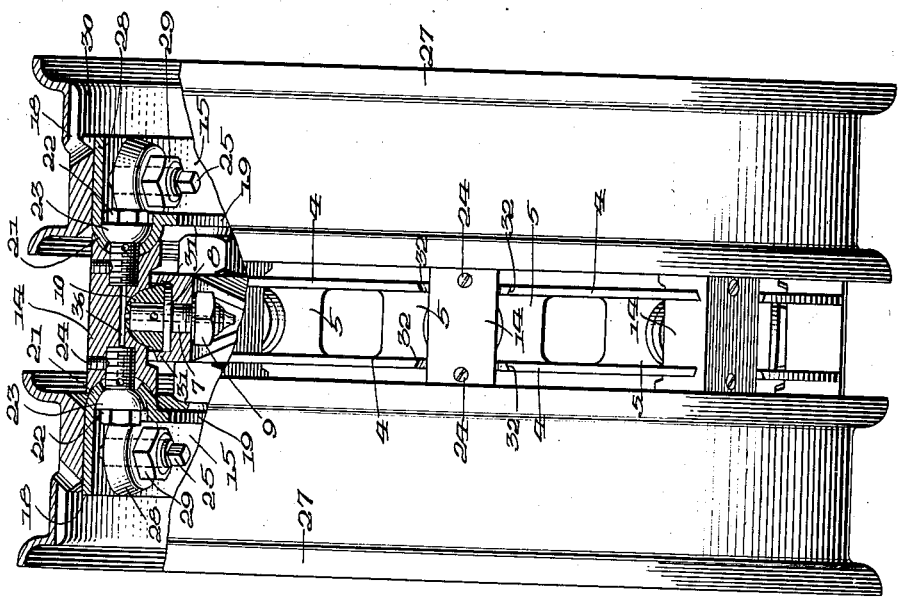
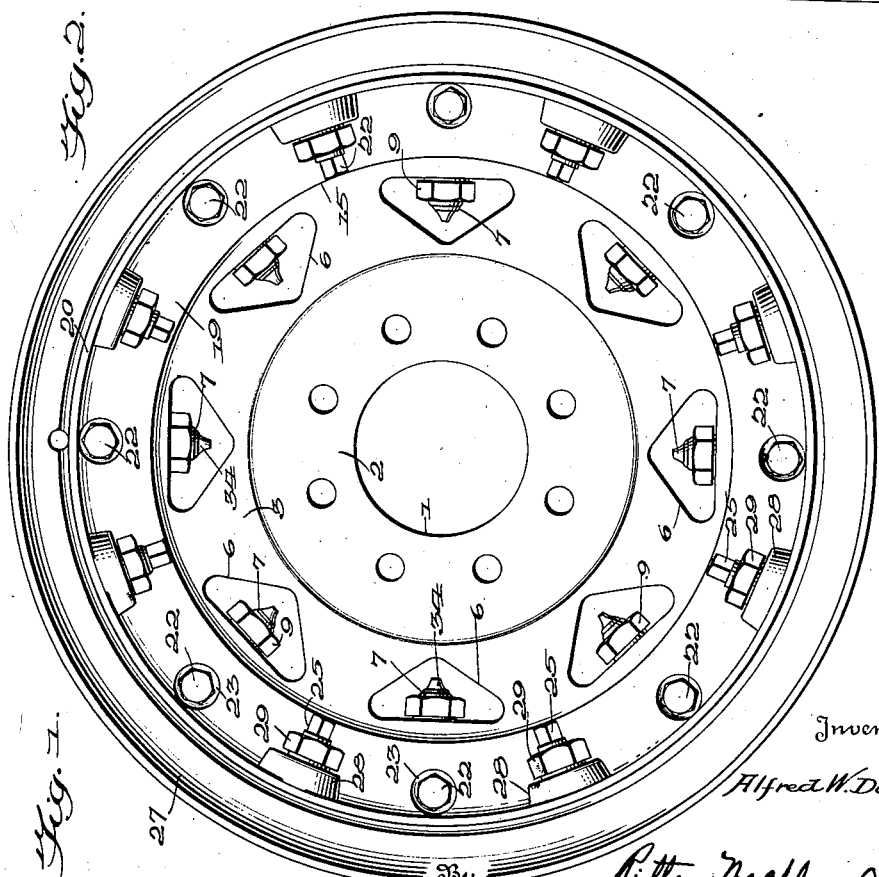
Inventor
Alfred W. Dunn,
By Ritter, Mechlin & O'Neill
his Attorneys

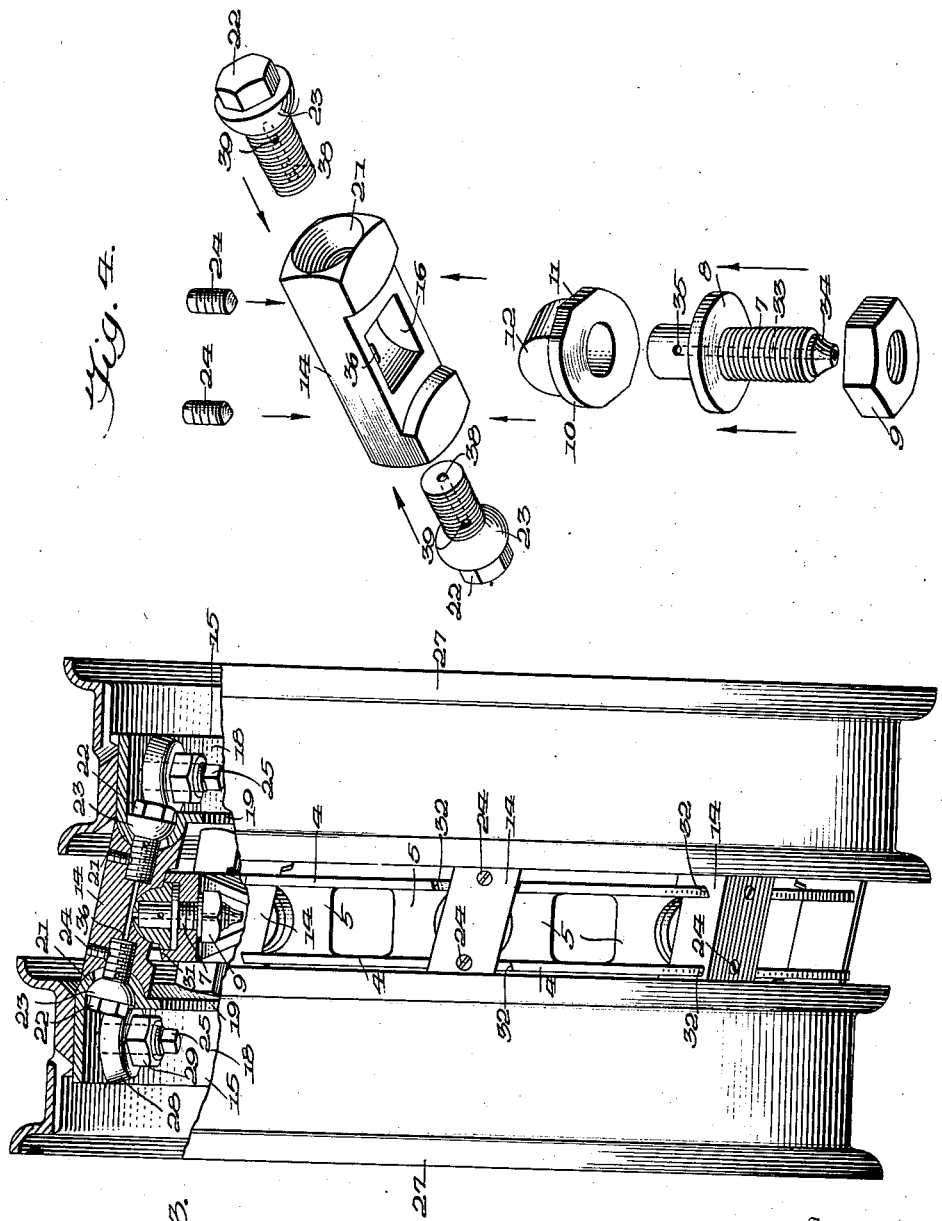

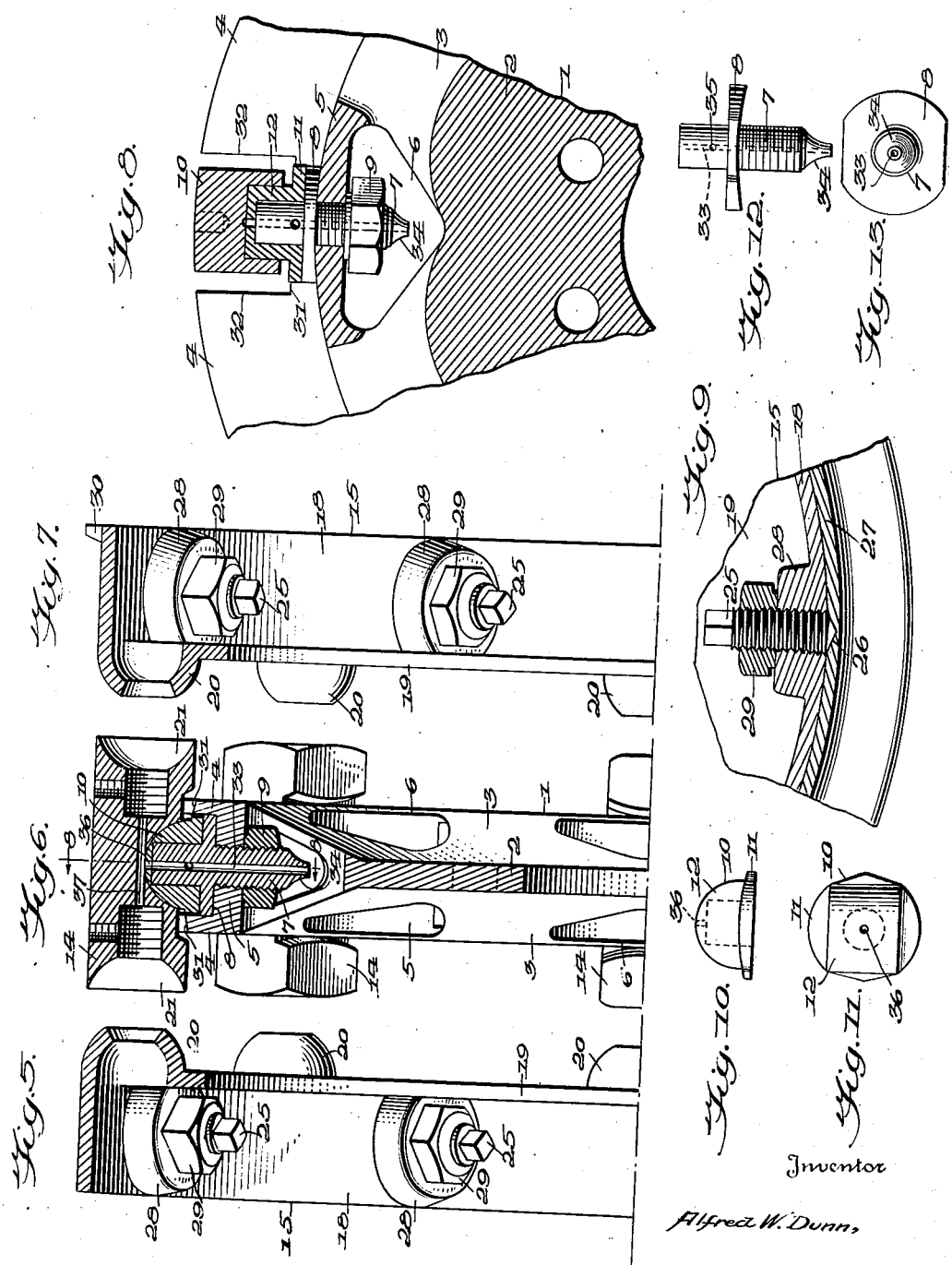

Patented June 1, 1937

2,082,384

UNITED STATES PATENT OFFICE 2,082,384

DUAL WHEEL

Alfred W. Dunn, Honomu, Hawaii

Application June 10, 1935, Serial No. 25,920

11 Claims. (Cl. 301—5)

My invention relates to improvements in wheels and more particularly to dual wheels which are commonly employed on heavy vehicles such as trucks, busses and the like.

The principal object of the invention is to provide the wheel with improved means for permitting the two tires to move relatively to the hub of the wheel and relatively to each other to compensate for unevenness in road beds and, in cases where pneumatic tires are employed, to further compensate for differences in tire inflation, to the end that an even distribution of load on the tires is insured.

One of the features of the invention consists in providing the wheel with two relatively movable members to which tire rims may be movably secured and in so forming the means connecting the members that it affords a convenient support over which the innermost tire rim may be easily slid in mounting or demounting.

Another feature of the invention consists in forming the portions of the wheel enabling relative movement of the tires in such manner that they may be easily and conveniently lubricated so as to reduce friction.

Another feature of the invention consists in providing rigid and reliable means for preventing an undue amount of relative movement between the tires so that, when pneumatic tires are employed and one becomes entirely deflated, the remaining inflated tire will support the entire load and it is prevented from moving relatively to the wheel hub to such an extent as to permit "riding" on the deflated tire and its rim.

Other and more specific features of the invention, residing in advantageous forms, combinations and relations of parts, will hereinafter appear and be pointed out in the claims, reference being had to the accompanying drawings, in which:—

Figure 1 is a side elevational view of the dual wheel.

Figure 2 is an end elevational view of the wheel, partly in section.

Figure 3 is a view similar to Figure 2 but illustrating the relative position of the parts when the tire carrying members have been moved with respect to each other the greatest permissible amount.

Figure 4 is a disassembled view of one of the mechanisms employed for movably connecting the tire carrying members to each other and to the wheel hub.

Figure 5 is a fragmentary vertical sectional view of the inner tire carrying member of the wheel.

Figure 6 is a fragmentary vertical sectional view of the hub member of the wheel showing the mechanisms for connecting the tire carrying members mounted thereon.

Figure 7 is a vertical sectional view of a portion of the outer tire carrying member.

Figure 8 is a detail sectional view taken on line 8—8 of Figure 6.

Figure 9 is a vertical sectional view taken through one of the tire rim securing members.

Figure 10 is a side elevational view of one of the bearing blocks.

Figure 11 is a plan view of the bearing block.

Figure 12 is a side elevational view of one of the stud members on which the bearing blocks are revolubly mounted.

Figure 13 is a plan view of one of the stud members.

Referring more particularly to the drawings, 1 indicates the wheel hub which may be rigidly connected in any approved manner to an axle (not shown). The hub may be conveniently provided with a centrally disposed web 2 adjacent the center thereof and with outwardly diverging plate portions 3 which terminate at the periphery of the hub in substantially vertical transversely spaced flanges 4. Adjacent the juncture of the diverging portions 3 and the flanges 4, these spaced portions of the hub are rigidly tied together but, instead of being connected by a continuous circular flange, they are preferably connected by a plurality of circumferentially spaced plate portions 5. For a purpose which will hereinafter appear, the diverging portions 3 of the hub are formed with openings 6 of substantially triangular shape.

Projecting on opposite sides of each of the plate portions 5 is a stud 7 which is provided inwardly of its outer end with a lateral flange 8 overlapping the outer face of the associated plate portion 5, the surface of the flange 8 cooperating with the plate portion being preferably arcuate, as clearly shown in Figure 12, so as to conform to the curvature of the outer surface of the plate. The inner end of each of the stud members is screw threaded to receive a nut 9 for rigidly securing the stud to the wheel hub.

Revolubly mounted on the outer end of each of the studs 7 is a bearing block 10 having a base flange 11 engaging the outer surface of the lateral flange 8 of the stud. Each bearing block is also provided with a semi-cylindrical portion 12 affording a support for the associated equalizing bar to be described.

Adjacent each of the bearing blocks 10, the vertical flanges 4 of the hub are recessed or cut away as at 13 for receiving the equalizing bars 14 which movably connect the tire carrying members 15 disposed on opposite sides of the hub. The equalizing bars 14 project laterally beyond the sides of the hub and each is provided on its under side with a semi-cylindrical recess 16 for receiving the correspondingly shaped portion of the cooperating bearing block. It will be perceived that, since the equalizing bars are capable of rocking upon the cylindrical portions of the bearing blocks 10 and the bearing blocks are capable of revolving about the studs 7, the equalizing bars have universal movement with respect to the wheel hub.

Each of the tire carrying members 15 may be conveniently formed as a ring having a circular flange 18 and a plate portion 19 extending inwardly toward the axis of the hub. The plate portions 19 are formed with convexo-concave lateral projections 20 which are adapted to be received in spherical recesses or sockets 21 in the ends of the equalizing bars 14. Tap bolts 22 are preferably employed for movably connecting the tire carrying members 15 to the equalizing bars, the bolts being screw threaded into the ends of the equalizing bars and being provided with spherical heads 23 overlappingly engaging the concave surfaces of the projections 20 of the tire carrying members. Such a connection, it will be perceived enables universal movement of the tire carrying members with respect to the equalizing bars. Set screws 24 may be conveniently employed to secure the bolts 22 in a desired position of adjustment and to prevent the latter, of their own accord, from either working loose or from working in the opposite direction and thus causing the relatively movable cooperating surfaces of the parts they secure from binding. Each of the tire carrying members 15 of the wheel assembly is provided with a plurality of radially movable screws 25 having pointed ends which are adapted to extend within recesses 26 formed in the inner side of the cooperating tire rim 27. The portions of the circular flange 18 into which the screws 25 are threaded are preferably reinforced by inwardly extending circular bosses 28 and the screws, which are formed at their inner ends so as to receive a socket wrench or the like, may be provided with lock nuts 29.

While each of the tire carrying members 15 is preferably identical, the one which is adapted to receive the innermost tire may be conveniently provided at the outer edge of the circular flange 18 with a circular rib 30 affording means for arresting inward movement of the tire rim as it is being mounted and for insuring proper positioning of the rim with respect to the securing screws 25. It is to be particularly observed that the equalizing bars in addition to their normal functions are so positioned that their outer surfaces form, in effect, continuations of the outer surfaces of the circular flanges 18 of the tire carrying members. The inner tire rim may, therefore, be conveniently mounted and demounted by merely being slid across the equalizing bars from one rim to the other and it is thus unnecessary for the rim and associated tire to be externally supported.

The bottom walls 31 of the recesses 13 formed in the peripheral flanges 4 of the hub afford stops limiting movement of the equalizing bars about axes normal to diameters of the hub and the side walls 32 of the recesses 13 afford stops limiting movement of the equalizing bars about axes parallel to diameters of the wheel. As the equalizing bars have a substantial cross sectional area and as the portions of the hub affording stops therefor are of adequate strength, means is thus provided for effectively preventing an undue amount of movement between the tire carrying members whereby, in the event one of the tires becomes deflated, the load theretofore borne equally by both tires will be efficiently borne by the remaining inflated tire.

In order that the cooperating movable surfaces of the dual wheel may be easily lubricated, the studs 7 are respectively provided with longitudinally extending lubricant passageways or ducts 33 and the inner end of each of the studs is formed, as at 34, so as to cooperate with a conventional form of lubricant supplying device (not shown). Inwardly of their outer ends, each of the studs are formed with transverse ducts 35 communicating with the longitudinal ducts 33 thereof to enable lubricant to be supplied to the cooperating surfaces of the stud and its associated bearing block 10. The outer ends of the bearing blocks are also provided with ducts 36 registering with the longitudinal ducts 33 of the studs whereby lubricant may be supplied to the cooperating surfaces of the bearing blocks and equalizing bars and the ducts 36 communicate with ducts 37 extending longitudinally of the equalizing bars. To enable lubricant to be supplied to the surfaces of the spherical portions of the projections 20 of the tire carrying members which respectively cooperate with the equalizing bars and the tap bolts 22, the latter are formed with longitudinally extending ducts 38 respectively terminating in transverse ducts 39 enabling lubricant to be discharged into the openings of the projections 20 through which the tap bolts pass. By providing the various parts with the lubricant passageways or ducts just described, it will be perceived that lubricant may be easily and effectively supplied to all of the movable cooperating surfaces of the wheel assembly.

What I claim is:

1. A dual wheel including a hub member, equalizing bars circumferentially arranged on the hub member and mounted thereon so as to have universal movement with respect thereto, ring members disposed on opposite sides of the hub member and connected to said equalizing bars so as to have universal movement with respect thereto, and tire rims respectively mounted on said ring members, each of said ring members having a circular portion affording a support for the associated tire rim and each of said equalizing bars being so disposed that the outer side thereof constitutes a continuation of corresponding parts of the outer surfaces of the circular portions of the ring members whereby said bars afford a support for the innermost rim over which the latter may be slid in mounting and demounting.

2. A dual wheel including a hub member, a plurality of bearing blocks circumferentially arranged on the hub member, a plurality of equalizing bars having recessed portions for respectively receiving the outer ends of said bearing blocks, each of said bearing blocks being adapted to permit its cooperating equalizing bar to have universal movement with respect to the hub member, tire carrying members disposed on opposite sides of the hub member and respectively having universal movement relatively to said equalizing bars, said tire carrying members and equalizing bars having cooperating spherical portions, and means respectively passing through said spherical portions connecting the tire carrying members to the bars.

3. A dual wheel including a hub member, studs arranged circumferentially of the hub and projecting radially therefrom, bearing blocks revolubly mounted on the studs, equalizing bars respectively mounted on the bearing blocks for rocking movement relatively thereto, and tire carrying members disposed on opposite sides of the hub member and respectively connected to the equalizing bars so as to have universal movement with respect thereto.

4. A dual wheel including a hub member, studs arranged circumferentially of the hub member and projecting radially therefrom, bearing blocks revolubly mounted on the studs, each of said bearing blocks having a cylindrically curved outer surface, equalizing bars having recesses for respectively receiving said bearing blocks, and tire carrying members disposed on opposite sides of the hub and respectively connected to said equalizing bars so as to have universal movement with respect thereto, each of said equalizing bars and its cooperating bearing block being revoluble as a unit about the associated stud and each of said bars being movable independently of its bearing block about an axis substantially normal to the cooperating stud.

5. A dual wheel including a hub member, a plurality of equalizing bars circumferentially arranged on the hub and mounted thereon so as to have universal movement with respect thereto, the opposite ends of each of said bars being provided with spherical recesses, tire carrying members disposed on opposite sides of the hub member, each of said tire carrying members having spherically shaped portions respectively fitting within the spherical recesses of the adjacent ends of said equalizing bars, and a plurality of means connecting said tire carrying members to the equalizing bars, said means respectively passing through the spherically shaped portions of the tire carrying members and the spherical recesses of the equalizing bars and permitting said members to move universally with respect to said bars.

6. A dual wheel including a hub member, a plurality of equalizing bars circumferentially arranged on the hub and mounted thereon so as to have universal movement with respect thereto, each end of each of said bars having a spherical recess, tire carrying members disposed on opposite sides of the hub and respectively having lateral projections provided with convexo-concave portions, the convex surfaces of said portions respectively cooperating with the spherical recesses of said bars, and means for securing the tire carrying members to said bars, said means respectively passing through said convexo-concave portions and having spherical surfaces respectively cooperating with the concave surfaces of the latter.

7. A dual wheel including a hub member, a plurality of equalizing bars circumferentially arranged on said hub member, bearing blocks respectively interposed between the equalizing bars and the hub member to permit the bars to move universally with respect to the hub, each of said bars being provided with spherical recesses in its opposite ends, tire carrying members disposed on opposite sides of the hub member and respectively having lateral projections provided with spherical portions extending into the spherical recesses of said bars, and means respectively passing through said lateral projections connecting the tire carrying members to said bars said means enabling the tire carrying members to have universal movement with respect to the bars.

8. A dual wheel comprising a hub having peripheral flanges spaced longitudinally of the axis thereof, said flanges being provided with a plurality of alined recesses, equalizing bars disposed in said recesses and adapted to have universal movement with respect to the hub, portions of said flanges adjacent the equalizing bars respectively affording stops limiting movement of the latter about axes parallel to the diameters of the hub, and tire carrying members disposed on opposite sides of said hub member and respectively connected to opposite ends of said equalizing bars so as to have universal movement relatively thereto.

9. A dual wheel including a hub member, a plurality of equalizing bars circumferentially arranged on the hub member and having universal movement with respect thereto, ring members disposed on opposite sides of the hub and each having a circular flange and a plate portion extending inwardly from the latter substantially normal to the axis of the hub, and means respectively passing through said plate portions of the ring members for securing the latter to the equalizing bars so as to have universal movement with respect thereto, the circular flange of each of said ring members constituting means for removably receiving a tire rim.

10. A dual wheel including a hub member provided with a web and with plate portions extending transversely of the web adjacent the periphery of the hub, radially extending studs extending through and respectively secured to said plate portions, each of said studs being provided with a bearing block, equalizing bars mounted on said bearing blocks and the latter affording means enabling the equalizing bars to have universal movement with respect to the hub, and tire carrying members disposed on opposite sides of said hub and respectively connected to said equalizing bars so as to have universal movement with respect to the bars.

11. A dual wheel including a hub member, a plurality of revoluble bearing blocks circumferentially arranged on the hub, equalizing bars rockably mounted on said bearing blocks, each of said bars and its associated block being revoluble as a unit about an axis substantially normal to the axis of the hub, and tire carrying members disposed on opposite sides of the hub and respectively connected to the equalizing bars so as to have universal movement with respect thereto.

ALFRED W. DUNN.